United States Patent [19]

Liljegren et al.

[11] Patent Number: 5,151,725
[45] Date of Patent: Sep. 29, 1992

[54] APPARATUS AND METHOD FOR EDITING FILM

[75] Inventors: Gordon E. Liljegren, Burbank; David S. Inglish, La Crescenta, both of Calif.

[73] Assignee: The Walt Disney Company, Burbank, Calif.

[21] Appl. No.: 638,635

[22] Filed: Jan. 8, 1991

[51] Int. Cl.⁵ ............................................. G03B 21/00
[52] U.S. Cl. .................................. 352/129; 352/198; 352/69; 355/1; 362/32
[58] Field of Search .................. 352/129, 198, 69; 355/1; 362/32

[56] References Cited

U.S. PATENT DOCUMENTS

| | | | |
|---|---|---|---|
| 3,163,080 | 12/1964 | Miller | 355/1 |
| 3,302,517 | 2/1967 | Henkel | 352/198 |
| 3,596,083 | 7/1971 | Lovering | 362/32 |
| 3,856,389 | 12/1974 | Gardner | 352/129 |
| 4,219,259 | 8/1980 | Olodort | 352/129 |
| 4,427,283 | 1/1984 | Gasper | 355/1 |
| 4,483,585 | 11/1984 | Takami | 350/96.24 |
| 4,539,625 | 9/1985 | Bornstein et al. | 362/32 |
| 4,620,266 | 10/1986 | Baumann et al. | 362/32 |
| 4,676,592 | 6/1987 | Nishioka et al. | 350/96.25 |
| 4,747,660 | 5/1988 | Nishioka et al. | 350/96.25 |
| 4,883,333 | 11/1989 | Yanez | 362/32 |
| 4,887,190 | 12/1989 | Sadamune et al. | 362/32 |
| 4,907,133 | 3/1990 | Nath | 362/32 |
| 4,978,216 | 12/1990 | Liljegren et al. | 353/28 |

OTHER PUBLICATIONS

U.S. Patent Application, Ser. No. 596484 filed Oct. 12, 1990, Oriel, Liquid Lightguides, pp. 389, 401 (undated).
ICL Technology Zenon Illuminators, 1 pg. (undated).

*Primary Examiner*—Monroe H. Hayes
*Attorney, Agent, or Firm*—Pretty, Schroeder, Brueggemann & Clark

[57] ABSTRACT

A film editing table includes a light source mounted away from the editor's sitting position, with a light guide transmitting the light to the film editing table's optics to produce images on the table's rear projection screen with a brightness and color temperature substantially the same as the images displayed in commercial theatres such that accurate color judgments can be made for animation film. The editing table can also be used to edit dailies of live action motion picture films. The light source is preferably a Xenon light source and the light guide is preferably a liquid light guide. The end of the guide from which the light emanates is movable along three axes, producing the brightest image possible.

22 Claims, 4 Drawing Sheets

APPARATUS AND METHOD FOR EDITING FILM

BACKGROUND OF THE INVENTION

1. Field of the Invention

The present invention relates generally to film viewing devices and, more particularly, to an apparatus and method for projecting, viewing, and editing film.

2. Description of the Related Art

During the production of a motion picture film, a film editing table is used to view the film strips produced from a day's shooting, also known as dailies, and to cut and conform the film strips to the movie script. Sprocket wheels guide the film along a film pathway while a light source projects a beam of light through the film and, in conjunction with optics that include stationary and rotating prisms, illuminates frames of the film and projects a film image onto a relatively small, rear projection viewing screen. An editor sitting at the film editing table can view the dailies on the screen and place them in the proper sequence so they follow the movie script.

The light source of the film editing table typically comprises a tungsten-halogen incandescent lamp mounted in a lamp house assembly adjacent a point on the film pathway in front of the editor's sitting position A tungsten-halogen lamp produces light having a color temperature of approximately 2800°–3200° K. In contrast, the light source used in motion picture theatres (such as a xenon lamp) for commercially viewing the finished motion picture produces light having a color temperature greater than 5000° K. While the images viewed on the film editing table's screen therefore do not have the same brightness, clarity, and color relationships as those viewed in a theatre, the editing table's images are sufficient for the purpose of editing dailies Moreover, mounting a xenon lamp in the editing table's lamp house assembly is not practical because a xenon lamp requires a bulky lamp house due to the high voltage insulation needed for discharge type lamps such as a xenon short arc lamp. If it is desireable to view the film as illuminated with the brighter 5000° K. light, a screening room with a standard theatre projector can be used.

When animated films are produced, it is necessary to view sequences of the animation film to judge the animation color, including the background color and registration. To make such color judgments, it is critical that the film be illuminated with light having substantially the same color temperature as the light that will actually be used when the completed film is commercially shown. Conventional film editing tables are not suitable for this purpose, because tungsten-halogen lamps produce light at the wrong color temperature for making such color judgments. As a result, a screening room must be used to project the animation film sequences. Such screening rooms must be constructed or rented, increasing the cost of production, and the film sequences must be taken to the screening room, which might not be conveniently located to the animators. Moreover, oftentimes the screening room is not available on demand, and appointments to use the room must be made well in advance. Thus, it is presently a time consuming, expensive, and laborious process to edit animated films It would be advantageous if animated films could be edited while seated at a conveniently located table, without the expense and bother of taking sequences of film to a screening room.

From the foregoing description, it should be apparent that there is a need for an editing table that can be used to edit animated films without the need for viewing animation film sequences in a screening room. The present invention satisfies this need and provides further related advantages.

SUMMARY OF THE INVENTION

In accordance with the present invention, a film editing table includes a light source mounted away from the editor's sitting position, with a light guide transmitting the light from the light source to the film editing table's optics. This arrangement advantageously produces images on the table's rear projection viewing screen having a color temperature substantially the same as the images displayed in commercial theatres. In this way, rapid and accurate color judgments can be made for animation film right at the editing table.

In one embodiment of the invention, the light source can be, for example, a xenon light source adapted to be coupled by the light guide to the film editing table's optics. Mounting the light source away from the editor's sitting position reduces problems associated with heat from the light source. It also has been found that a liquid light guide transmits the greatest amount of light from the light source and provides the best image. This guide is conveniently mounted relative to the table's optics such that conventional film editing table optics can be used. In one aspect of the invention, the end of the light guide from which the light emanates can be moved along three axes to achieve the maximum light intensity and most even illumination on the table's rear projection screen.

By using the optics of a conventional film editing table, the present invention provides a film editing table suitable for conveniently editing animation film sequences at relatively low cost. The light emanating end of the light guide is placed relative to the table's optics at the location otherwise occupied by the filament of a tungsten-halogen lamp. A tungsten-halogen lamp typically produces light with a color temperature of approximately 2800°–3200° K. and, after passing through the table's optics, provides a lighted viewing screen having a color temperature of approximately 3000°–3400° K. In accordance with the present invention, the light emanating from the liquid light guide has a color temperature of approximately 8000° K., providing a lighted viewing screen having a color temperature of approximately 6000° K. A glass fiber optic light guide has been found to provide a color temperature of approximately 5400° K. and a viewing screen with a color temperature of approximately 4600° K. Thus, it has been discovered that the film editing table's optics differentially affect the color temperature of light reaching the viewing screen depending on the light source's color temperature, such that a xenon light source and liquid light guide provide an illuminated screen image substantially the same as that produced in commercial theatres. This allows accurate color judgments to be made while viewing animation film sequences at the editing table. Thus, it is no longer necessary to shuttle back and forth to a screening room while editing animation film sequences.

Other features and advantages of the invention should be apparent from the following description of the preferred embodiment, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
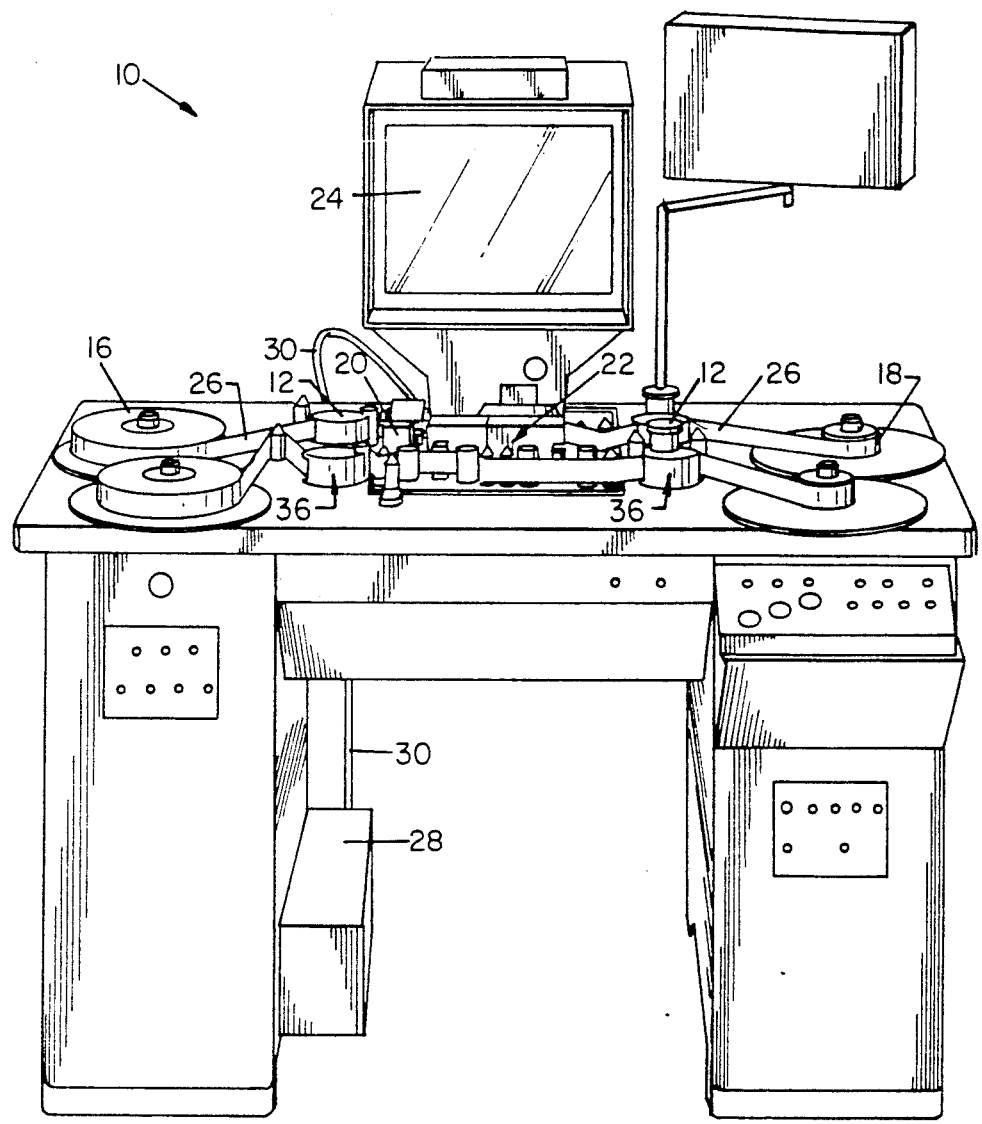
FIG. 1 is a perspective view of a film editing table in accordance with the invention.
Figure 2:
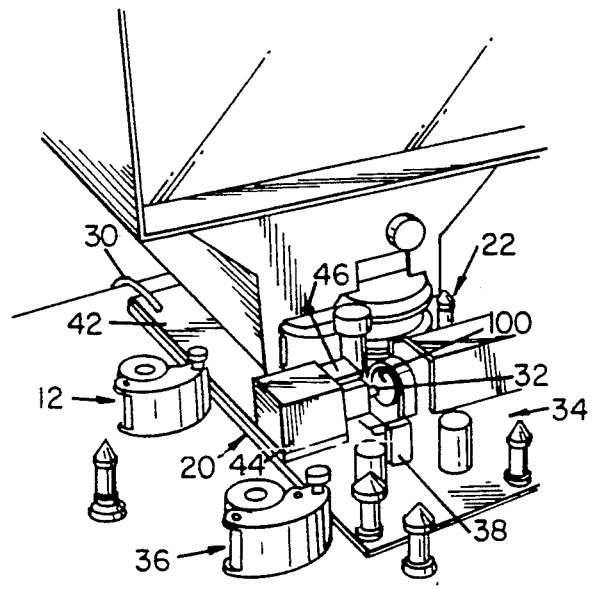
FIG. 2 is a detailed perspective view of the light house assembly and optical housing of the film editing table illustrated in FIG. 1.

Referring to FIGS. 1 and 2, a film editing table 10 in accordance with the present invention includes film sprockets 12 defining a film pathway extending from a film reel 16 to a film take-up reel 18. A light house assembly 20 is located adjacent a point on the film pathway and directs a light beam into an optical housing 22, projecting light onto a rear projection viewing screen 24 such that the lighted screen has a color temperature substantially the same as the light used to show motion pictures in commercial theatres. Thus, if a film strip 26 is threaded along the film pathway, the light beam from the light house assembly 20 produces a projected film image on the viewing screen 24 that is substantially identical to what will be seen in movie theatres when the completed film is shown. This makes the film editing table 10 ideal for editing animation film sequences, when critical color judgments must be made.

The editing table 10 includes a light source 28 and a flexible light guide 30 that transmits light from the light source to the light house assembly. In accordance with the invention, the light source 28 is remotely mounted from the optical housing 22. This reduces problems associated with heat which could be uncomfortable to the operator and harmful to the film. For example, the light source 28 can be located on the floor next to the editing table 10, as shown in FIG. 1, or at another convenient location.

Light is directed from an emanating end 32 of the light guide 30 into the optical housing 22 of the film editing table 10. In particular, when the light source is a xenon light source adapted to be coupled to a light guide, and the light guide is a liquid light guide, it has been discovered, that the light emanating from the end of the light guide has a color temperature of approximately 8000° K. and that the light at the viewing screen 24 has a color temperature of approximately 6000° K. This advantageously produces a projected film image on the viewing screen 24 that is virtually identical to what will be seen in movie theatres when the completed film is shown. The editing table 10 also includes audio track sprockets 36 and a magnetic head 38.

Figure 3:
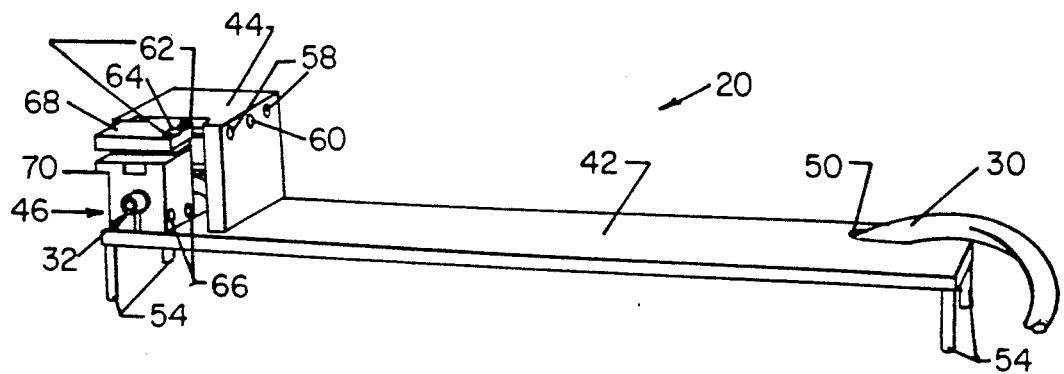
FIG. 3 is a perspective view of the light house assembly illustrated in FIG. 1.
Figure 4:
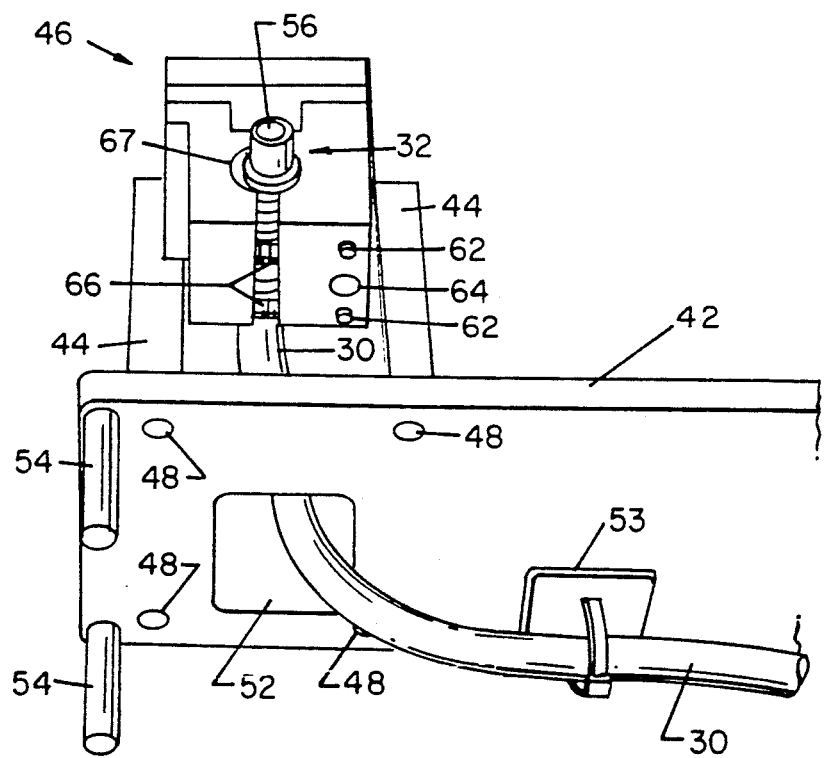
FIG. 4 is another perspective view of the light house assembly as viewed from the bottom.

The light house assembly 20 is shown in greater detail in FIGS. 3 and 4. The light house assembly includes a cover plate 42, a support structure 44, and a coupling head 46. The support structure 44 is attached to the cover plate 42 by four screws 48 extending upwardly from the underside of the cover plate 42. The cover plate includes two openings for the light guide 30, a rearward opening 50 through which the light guide is received from the light source 28, and a forward opening 52 that allows the light guide to extend up into the support structure 44 for attachment to the coupling head 46. A clip 53 holds the light guide 30 to the underside of the cover plate 42. The light house assembly 20 is connected to the top surface of the film editing table 10 by four downwardly extending legs 54 that are received by a recess (not shown) in the film editing table 10.

The construction of the support structure 44 and coupling head 46 of the light house assembly 20 allow the emanating end 32 of the light guide 30 to move along three axes relative to the optical housing 22. By providing adjustment along three axes, the end surface 56 of the light guide can be precisely positioned relative to the optics of the optical housing 22. This ensures that the optics within a conventional film editing table can be used without modification. As explained in more detail below, from the perspective of the end surface 56, the light house assembly allows the light guide to move left and right along the horizontal direction defined by a pair of guide pins 58 when a threaded horizontal bolt 60 is rotated and to move vertically up and down along an axis defined by two vertical guide pins 62 when a threaded vertical bolt 64 is rotated. Finally, the assembly allows the end of the light guide to move in and out, closer to and further away from the optical housing 22, by loosening two coupling bolts 66.

Figure 5A:
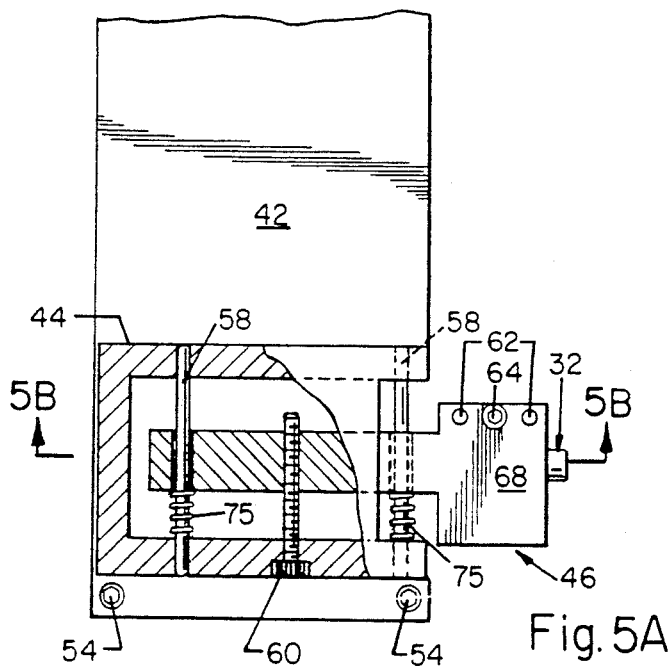
FIGS. 5A, 5B, and 5C are plan views of the light house assembly illustrated in FIGS. 3 and 4 showing the moving parts in phantom and cut-away.
Figure 5B:
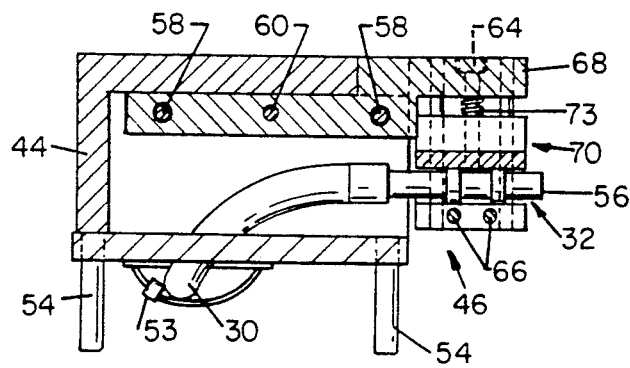
Figure 5C:
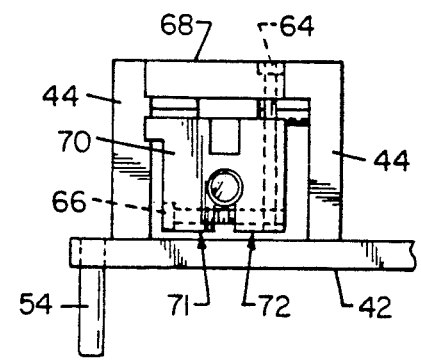

FIGS. 5A, 5B and 5C are views that show, in phantom and cross-section, the details of the horizontal, vertical, and in-out movement, respectively, of the emanating end 32 of the light guide 30. FIG. 5A is a plan view with partial cut-away, and FIG. 5B is a sectional view taken along the lines marked in FIG. 5A. FIG. 5C is an end view of the light house assembly 20 and coupling head 46. The coupling head 46 comprises a top portion 68 and a lower portion 70 having a circular opening 67, into which the end 32 of the light guide 30 is inserted, and two spaced apart legs 71 and 72. The coupling bolts 66 pass through both legs in a threaded bore. When the two coupling bolts 66 are loosened, the legs 71 and 7 are moved further apart, effectively increasing the diameter of the circular opening 67. This allows the emanating end 32 of the light guide 30 to be moved in and out relative to the coupling head 46 and, thus, the optical housing 22. When the emanating end has reached its desired position, the two bolts 66 are once again tightened, pressing the legs 71 and 72 tighter together and holding the light guide's emanating end 32 in position.

When the end surface 56 of the light guide 30 is to be moved up and down relative to the support structure 44 and, thus, the editing table 10, the vertical bolt 64 is rotated. The vertical bolt passes through the lower portion 70 in a threaded bore, so that rotating the bolt moves the lower portion 70 against the force of a spring 73 mounted coaxially on the bolt, allowing the lower portion to be moved continuously away from and closer to the upper portion 68. Thus, rotation of the vertical bolt 64 in either direction will move the end surface 56 up and down relative to the support structure 44 and, thus, the light house assembly 20.

To provide movement from side to side along the horizontal axis, the top portion 68 of the coupling head 46 moves continuously relative to the support structure 44 as the horizontal bolt 60 is rotated, allowing the coupling head to move back and forth along the path defined by the guide pins 58. The horizontal bolt passes through the top portion 68 in a threaded bore. When the horizontal bolt 60 is rotated, the top portion is moved against the force of springs 75 on the guide pins 58 between the support structure 44 and the top portion. Thus, the top portion can be positioned almost anywhere between the projecting walls of the support structure by simply rotating the horizontal bolt 60. While FIGS. 5A, 5B and 5C show a particular structure for moving the emanating end 32 of the light guide 30, it is to be understood that other constructions are also suitable, as long as they allow three-axis adjustment of the light guide relative to the optical housing 22.

Figure 6:
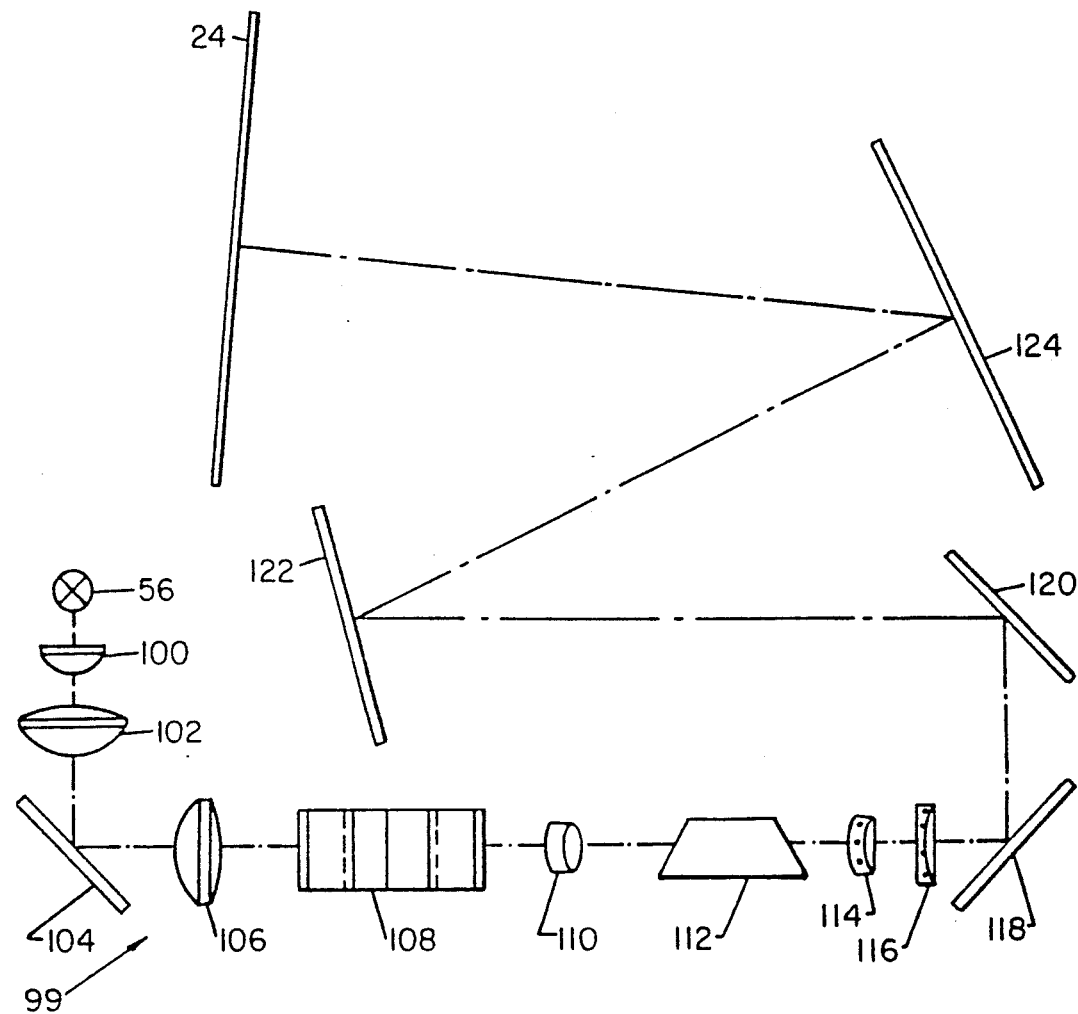
FIG. 6 is a diagram of the optics of the film editing table illustrated in FIG. 1.

FIG. 6 is a diagram representing the optical path of light from the end surface 56 of the light guide 30 through the optical housing 22 of the film editing table 10 and to the rear projection viewing screen 24. As noted above, the end surface 56 of the light guide 30 is placed at a position adjacent the optics of the optical housing 22, which in the preferred embodiment is substantially where the filament of a tungsten-halogen lamp would be located in a conventional film editing table. The light emanating from the light source 28 via the light guide 30 then enters the optical housing 22 of the film editing table, reaching a first condenser lens 100 and then a second condenser lens 102 and then striking a cold light mirror 104, where the light is directed to a third condenser lens 106. The light then reaches a rotating prism 108 where film images are combined, and then reaches an achromat 110 and then a dove prism 112 for rotating the film image. Two supplementary lenses 114 and 116 next focus the light onto a first coated mirror 118, then to a second coated mirror 120 and a third coated mirror 122, and finally to a fourth coated mirror 124, whereupon the light is directed to the viewing screen 24. The foregoing description of the optics 99 of the optical housing 22 is conventional and can be found in many film editing tables, such as Model No. K-800 manufactured by KEM Editing Systems, Inc.

It has been discovered that the optics 99 of the film editing table 10 described above change the color temperature of the light from the time it enters the optical housing 22 to the time an image is displayed at the viewing screen 24. For example, light from a tungsten-halogen lamp generally will enter the optical housing 22 with a color temperature of approximately 2800°-3200° K., but will appear at the screen 24 with a color temperature of approximately 3000°-3400° K. In accordance with the preferred embodiment of the present invention, the light source 28 comprises a xenon light source manufactured by ILC Technology, Inc., Model No. ILC 201, and the light guide 30 comprises a liquid light guide, such as Model No. 77557 manufactured by Oriel This combination has been found to produce a light emanating from the end surface 56 of the light guide having a color temperature of approximately 8000° K. It is to be understood that other light sources and light guides producing these color temperatures would also be suitable. It also has been found that, after the light has travelled through the optics 99 of the optical housing, the light image produced on the viewing screen 24 will have a color temperature of approximately 6000° K. This color temperature is approximately equal to the color temperature of commercial projection systems Thus, the image viewed by the editor on the screen 24 will be substantially the same, in terms of color rendition and intensity, as that seen when the completed film is shown in a commercial theatre. This characteristic makes the film editing table in accordance with the present invention ideal for editing animated films, as well as for viewing dailies or other action film strip portions.

A film editing table having a light source and light guide constructed in accordance with the present invention provides significant advantages over conventional editing devices, especially when animation film sequences are to be edited. The viewing image produced is substantially identical in brightness to the image produced by commercial theatres, thus eliminating the need to schedule time in a screening room to make accurate color judgments. By remotely mounting the light source and transmitting the light to the editing table's optics with a light guide, heat problems for the operator and film are reduced. Thus, even animation film sequences can be conveniently and accurately edited while seated at the film editing table.

The present invention has been described above in terms of a presently preferred embodiment so that an understanding of the invention can be conveyed. There are, however, many configurations for film editing tables not specifically described herein, but with which the present invention is applicable. The present invention should therefore not be seen as limited to the particular embodiments described herein, rather, it should be understood that the present invention has wide applicability with respect to film editing tables. Such other configurations can be achieved by those skilled in the art in view of the descriptions herein. Accordingly, the scope of the invention is defined by the following claims.

I claim:

1. A film editing machine, comprising:
   film transport means for providing a film pathway;
   a light source that produces an illuminating light;
   light transmitting means for receiving light from the light source transmitting the light while shifting the color temperature of the light;
   optical transmission means for receiving the shifted light from the light transmitting means, further shifting the color of the light to a predetermined range, and directing it across the film pathway for producing a projected image; and
   a viewing screen that can display the projected image;
   wherein the light source is remotely mounted from the optical transmission means and the light transmitting means comprises a light guide that receives light from the light source at a first guide end and transmits that light to a second guide end adjacent the optical transmission means.

2. A film editing machine as defined in claim 1, wherein the light guide is a liquid light guide.

3. A film editing machine as defined in claim 1, wherein the light source is a xenon light source.

4. A film editing machine as defined in claim 1, wherein the light source and light guide are adapted to produce light emanating from the second guide end having a color temperature greater than 7000° K.

5. A film editing machine as defined in claim 1, wherein the light source, light guide and optical transmission means are adapted to produce light on the viewing screen for viewing the projected image having a color temperature of approximately 6000° K.

6. A film editing machine as defined in claim 1, wherein the light transmitting means further comprises adjustment means for moving the second guide end of the light guide along three axes relative to the optical transmission means.

7. A film editing machine as defined in claim 1, wherein the light from the light source has a color temperature of approximately 8000° K. and the light for projecting the image on the viewing screen has a color temperature of approximately 6000° K.

8. A film editing machine as defined in claim 1, wherein the light guide receives light having a first color temperature from the light source at the first guide end and transmits that light to the second guide end adjacent the optical transmission means such that the light projected onto the viewing screen has a second color temperature approximately equal to the color temperature of projected light in a movie theater.

9. A film editing machine having film transport means for providing a film pathway, light source means for producing a projection light, optical transmission means for receiving the projection light from the light source means and directing it across the film pathway to produce a projected image, and a viewing screen located adjacent to the film transport means that receives the projected image and displays it, wherein:

the light source means comprises a xenon light source located remotely from the optical transmission means and a liquid light guide that transmits light from the light source to the optical transmission means and that shifts the color temperature of the light.

10. A film editing machine as defined in claim 9, wherein the light transmitted from the light guide to the optical transmission means has a color temperature of approximately 8000° K.

11. A film editing machine as defined in claim 9, wherein the light source means includes means for moving the light guide along three axes relative to the optical transmission means to adjustably vary the illumination of the projected image on the viewing screen.

12. A film editing machine as defined in claim 9, wherein the liquid light guide shifts the color temperature of the light to at least 7000° K.

13. A light assembly for use with a film editing table having film transport means for defining a film pathway and receiving a film sequence to be illuminated by a beam of light, optical transmission means for receiving the beam of light and producing an illuminated image, and a display screen for displaying the illuminated image, the light assembly comprising:

a flexible, elongated light guide having a source end adapted to be connected to a light source and an emanating end; and light guide mounting means for attaching the emanating end of the light guide to the film editing table and moving it along three axes relative to the optical transmission means; wherein:

the light guide shifts the color temperature of the light such that the light projected onto the display screen has a color temperature approximately equal to the projected light in a movie theater.

14. A light assembly as defined in claim 13, wherein the light assembly further comprises a xenon light source.

15. A light assembly as defined in claim 13, wherein the light guide is a liquid light guide.

16. A method of editing film on a film editing machine of the type having film transport means for providing a film pathway, light source means for producing a light, optical means for receiving the light from the light source means and directing it across the film pathway to produce a projected image, and a viewing screen located adjacent to the film transport means for receiving the projected image and displaying it, the method comprising the steps of:

mounting the light source means remotely from the optical means;

producing light from the light source means having a color temperature of at least 5000° K.;

transmitting the produced light from the remotely mounted light source means to the optical means by using a light guide that shifts the color temperature of the light; and projecting an image on the viewing screen with light transmitted by the optical means having a color temperature approximately equal to the projected light in a movie theater.

17. A method of editing film as defined in claim 16, wherein the step of transmitting the light includes transmitting the light through a liquid light guide.

18. A method of editing film as defined in claim 16, wherein the light transmitted by the light guide to the optical means has a color temperature of approximately 8000° K., and wherein the light transmitted by the optical means to the viewing screen has a color temperature of approximately 6000° K.

19. A method of editing film as defined in claim 16, wherein the step of transmitting the light further includes the step of adjusting the position of the light guide relative to the optical means along three axes.

20. A film editing machine comprising:
a light source for producing light;
a light guide having a first end and a second end, the first end accepting the light from the light source and transmitting it to the second end;
a light guide housing coupled to the second end of the light guide;
a viewing screen;
optical transmission means for receiving light from the second end of the light guide and producing a projected image on the viewing screen; and
film transport means for providing a film pathway that accepts a film strip for illumination and passes it to a point between the second end of the light guide and the optical transmission means, producing an illuminated film strip image on the viewing screen.

21. A film editing machine as defined in claim 20, wherein the light guide housing includes adjustment means for moving the second end of the light guide along three axes relative to the optical transmission means to adjustably vary the lighting of the projected image on the viewing screen.

22. A film editing machine as defined in claim 20, wherein the first end and the second end of the light guide have the same index of refraction.

* * * * *